(12) United States Patent
Svendsen

(10) Patent No.: US 9,566,539 B2
(45) Date of Patent: Feb. 14, 2017

(54) $CO_2$ DESORPTION WITHOUT STRIPPER

(75) Inventor: John Arild Svendsen, Porsgrunn (NO)

(73) Assignee: STATOIL PETROLEUM AS, Stavanger (NO)

( * ) Notice: Subject to any disclaimer, the term of this patent is extended or adjusted under 35 U.S.C. 154(b) by 620 days.

(21) Appl. No.: 13/701,764

(22) PCT Filed: Jun. 1, 2011

(86) PCT No.: PCT/EP2011/059076
§ 371 (c)(1),
(2), (4) Date: Feb. 19, 2013

(87) PCT Pub. No.: WO2011/151390
PCT Pub. Date: Dec. 8, 2011

(65) Prior Publication Data
US 2013/0153402 A1    Jun. 20, 2013

(30) Foreign Application Priority Data
Jun. 2, 2010   (NO) .................................. 20100797

(51) Int. Cl.
*B01D 19/00*   (2006.01)
*B01D 53/62*   (2006.01)
*B01D 53/78*   (2006.01)
*B01D 53/14*   (2006.01)
*F23J 15/04*   (2006.01)

(52) U.S. Cl.
CPC ....... *B01D 19/0036* (2013.01); *B01D 53/1425* (2013.01); *B01D 53/1475* (2013.01); *B01D 53/62* (2013.01); *B01D 53/78* (2013.01); *F23J 15/04* (2013.01); *F23J 2215/50* (2013.01); *F23J 2219/40* (2013.01); *Y02C 10/04* (2013.01); *Y02C 10/06* (2013.01)

(58) Field of Classification Search
None
See application file for complete search history.

(56) References Cited

U.S. PATENT DOCUMENTS

| 4,009,083 A * | 2/1977 | Lyon ...................... B01D 3/343 159/DIG. 33 |
|---|---|---|
| 4,553,984 A | 11/1985 | Volkamer et al. |
| 4,583,998 A | 4/1986 | Reid |
| 4,997,630 A | 3/1991 | Wagner et al. |
| 5,061,465 A | 10/1991 | Carter |
| 5,820,837 A | 10/1998 | Marjanovich |
| 2007/0006731 A1 | 1/2007 | Menzel |
| 2009/0241778 A1 | 10/2009 | Lechnick et al. |

(Continued)

FOREIGN PATENT DOCUMENTS

| CA | 1 340 768 C | 9/1999 |
|---|---|---|
| DE | 3408851 | 9/1985 |

(Continued)

*Primary Examiner* — Daniel Berns
(74) *Attorney, Agent, or Firm* — Volpe and Koenig, P.C.

(57) ABSTRACT

A $CO_2$ desorption method and equipment for performing this method is described. More specific, a method for desorbing $CO_2$ from an absorption fluid without involving a traditional stripper but instead using a heat exchanger as a flash-tank is disclosed. Further described is the utilization of cooling heat from a condenser for cooling the lean absorbent fluid.

4 Claims, 2 Drawing Sheets

(56) References Cited

U.S. PATENT DOCUMENTS

2009/0293723 A1 12/2009 Steele
2011/0014100 A1* 1/2011 Bara et al. .................... 423/229

FOREIGN PATENT DOCUMENTS

| EP | 0 945 162 | 9/1999 | |
| RU | 2316384 | 1/2006 | |
| WO | WO2008/144918 | * 12/2008 | ............. B01D 53/14 |

* cited by examiner

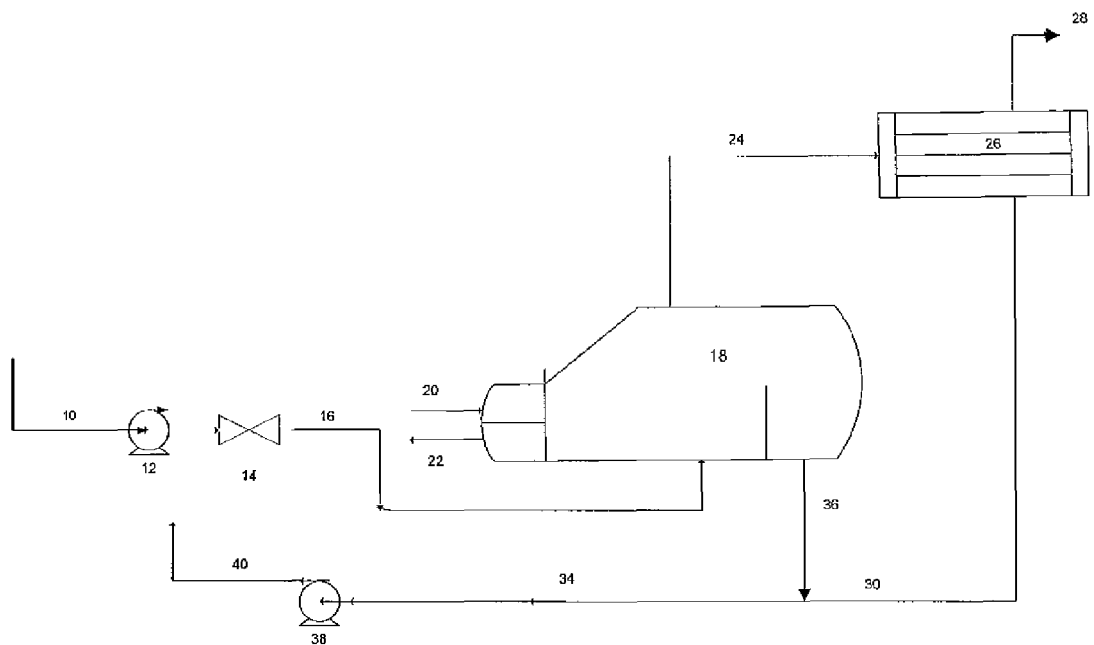
Figure: 1
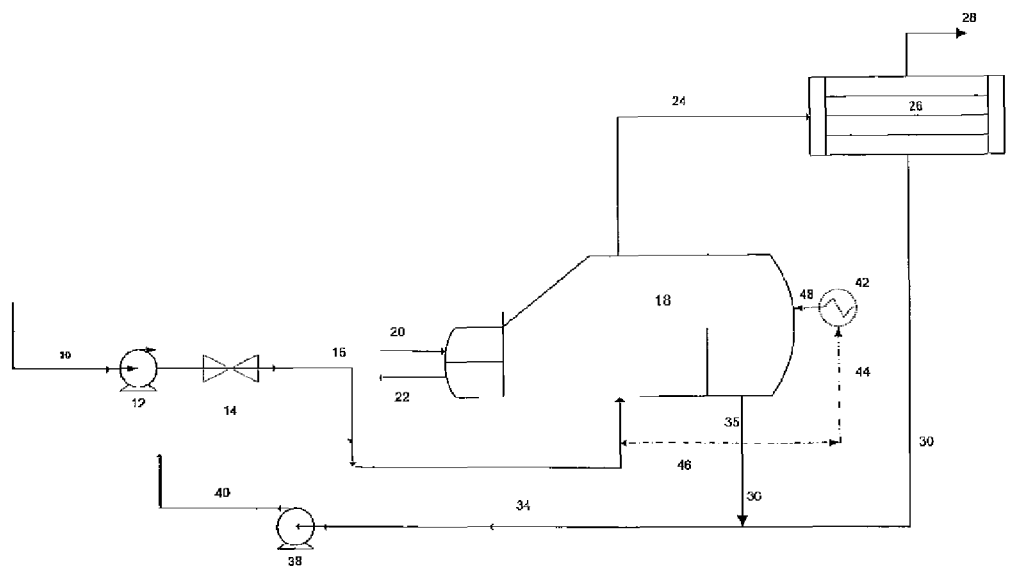
Figure: 2

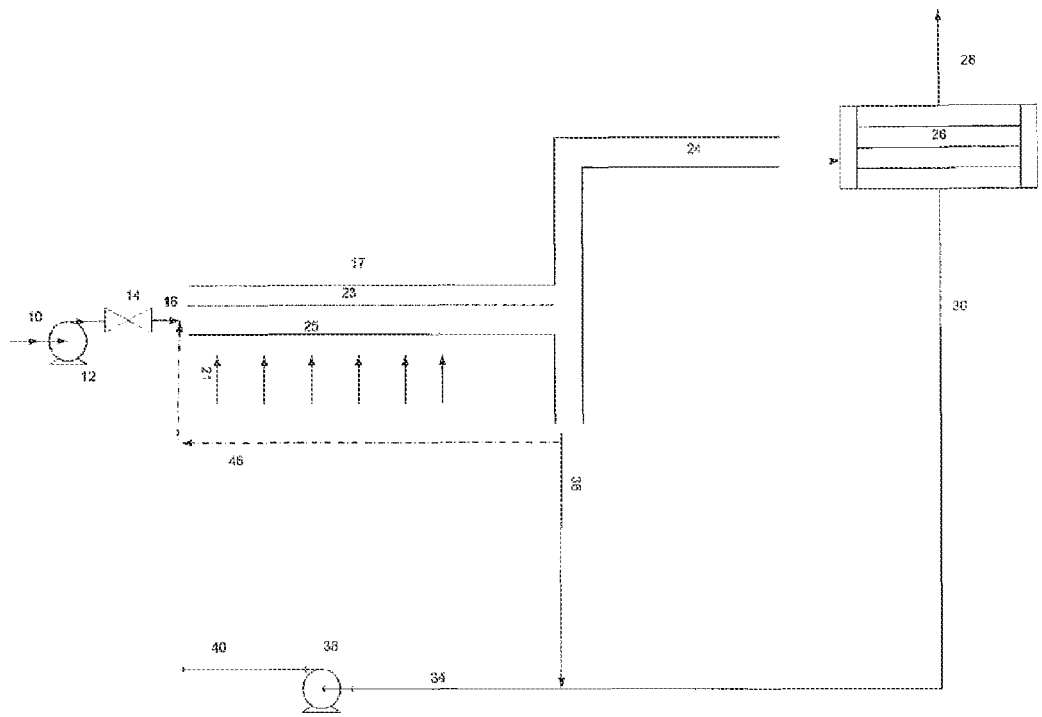
Figure: 3
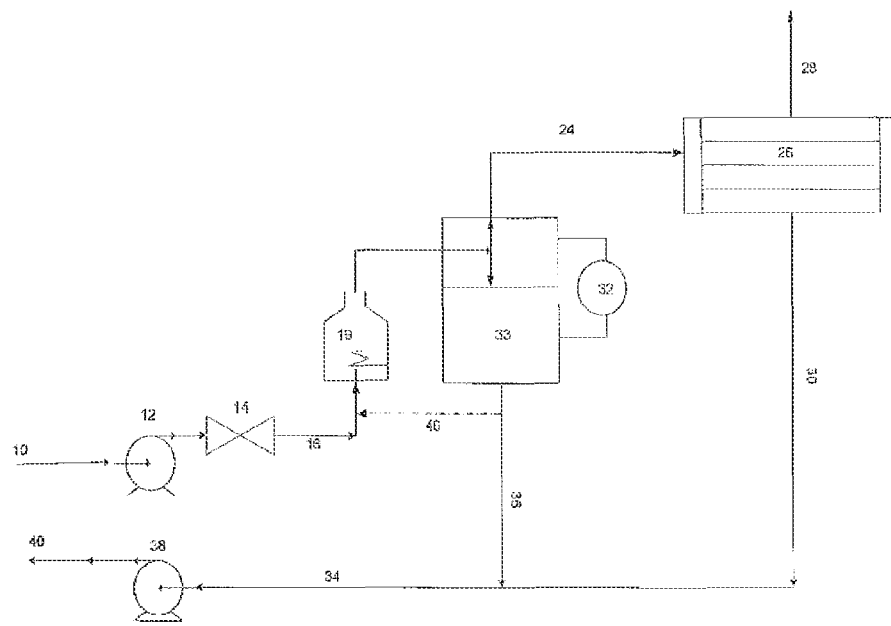
Figure: 4

$CO_2$ DESORPTION WITHOUT STRIPPER

This application is a 35 U.S.C. §371 national phase application of PCT/EP2011/059076, which was filed Jun. 1, 2011 and is incorporated herein by reference as if fully set forth.

The present invention relates to a $CO_2$ desorption method and system for performing this method. More specific the present invention relates to a method for desorbing $CO_2$ from an absorption fluid without involving a traditional stripper.

The separation of $CO_2$ from exhaust gases in connection with post-combustion power plants has received much attention lately and the present invention is especially applicable in connection with desorption of $CO_2$ captured from an exhaust gas stream.

In existing technology for $CO_2$ capture a counter-current packed column stripper and a reboiler is often an integral part of the desorption process (stripping). In this process chemical bound $CO_2$ in the liquid phase (typically an amine solution) is released into the gas phase. This is done by adding heat (typically steam) to obtain proper temperature and pressure for desorption in the stripper and the reboiler. An important conception is the $CO_2$ loading, defined as moles of $CO_2$ in liquid per moles of amine in liquid. Lean amine enters the absorber and leaves the stripper. Rich amine leaves the absorber and enters the stripper. As the names indicate the rich amine solution contains more $CO_2$ than lean amine, and therefore has higher loading. The loading depends strongly on the liquid temperature. Some of the amine, $CO_2$ and vapour released in the reboiler are transported back to the bottom section of the stripper column, making the reboiler an integral part of the stripper column. A condenser is installed to receive the stream that leaves the top of the stripper and remove water and absorbent.

A disadvantage with the existing design is that cold water with amine from the condenser is returned to the top of the stripper column and mixed with the rich amine, making the rich amine even colder.

Existing technology is expensive, and simplification is required in order to reduce energy consumption and building costs.

In U.S. Pat. No. 4,553,984 a process for the separation of $CO_2$ from a hydrocarbon gas stream is disclosed, the desorption proceeds in a flash tank. Heat is supplied to the rich absorbent stream in a separate heat exchanger arranged up stream of the flash tank. Water that leaves over the top of the flash tank is replaced by steam supplied to the bottom of the flash tank.

U.S. Pat. No. 5,820,837 discloses a process for removing the acid gasses $CO_2$ and $H_2S$ from a hydrocarbon gas stream. The disclosed process involves two flash steps. The first removes absorbed hydrocarbons, thereafter the rich absorbent is heated in a heat exchanger before $CO_2$ is flashed of. The heating accordingly occurs in a separate unit arranged upstream the flash unit. Further a stripper is included to remove remaining gas. Condensed solvent is returned to the top of the stripper.

U.S. Pat. No. 5,061,465 discloses a process for removing $CO_2$ from a hydrocarbon gas stream. The process comprises absorption and desorption utilizing a series of flash tanks. Supplying heat directly in the flash tanks is not disclosed.

The aim of the present invention is to provide a simpler solution for stripping a rich absorbent fluid that requires less equipment. A further object is to provide a method which is more energy efficient.

The present invention provides a method for desorbing carbon dioxide from a $CO_2$ rich absorption fluid comprising a $CO_2$ absorbent, a solvent and absorbed $CO_2$, characterised in that the method comprises heating the $CO_2$ rich absorption fluid, expanding the heated $CO_2$ rich absorption fluid in a flash tank, separating the expanded absorption fluid in a vapour phase comprising desorbed $CO_2$ and vaporised solvent and a main liquid phase comprising $CO_2$ lean absorption fluid, condensing at least part of the solvent within the vapour phase, and mixing the condensed solvent with the main liquid phase.

By mixing the condensed vapour phase mainly comprising solvent with the main liquid phase the cooled lean absorption fluid stream is obtained. Accordingly the present invention provides the utilization of cooling heat from a condenser for cooling the lean absorbent fluid.

In one embodiment of the method the difference in $CO_2$ loading between the rich and lean amine stream is within the range 0.20-0.30 mol $CO_2$/mol absorbent, preferably between 0.23-0.27 mol $CO_2$/mol absorbent. With a difference between rich and lean amine loading of the order 0.2-0.3 in both absorber and stripper, the $CO_2$ removal efficiency will normally be 85 mol % or above, also depending on correct gas/liquid flow ratio in the absorber.

The method according to the present invention may further comprise recycling a part of the main liquid phase into the rich absorption fluid prior to the mixing with condensed solvent and optionally heating a part of the main liquid phase before returning it to the flash tank.

Another aspect of the present invention is a system for desorbing carbon dioxide from a $CO_2$ rich absorption fluid, characterised in that the system comprises a flash-tank with an inlet, a vapour outlet and liquid outlet, where the vapour outlet is in fluid communication with an inlet to a condenser, where the condenser has a condensed fluid outlet in fluid communication with the liquid outlet from the flash-tank.

In one embodiment of the system it further includes a system for supplying heat to the flash-tank.

In yet another embodiment the flash-tank is a reboiler, a stratified flow pipe or a fired heater combined with a vessel.

The system according to the present invention may in one embodiment further comprise a recycling pipeline in fluid communication with the liquid outlet and an inlet to the flash tank, arranged up-stream the fluid communication between the condensed fluid outlet and the liquid outlet.

With the present invention both building cost and operating cost will be reduced compared to existing technology, mainly due to increased process simplicity. Simplicity is also favourable with respect to safer operation.

The idea of mixing the cold liquid flow from the condenser with the lean absorbent flow from the "flash-tank" is favourable with respect to reduced energy consumption. The rich absorbent shall not be cooled. On the contrary, the temperature of the rich absorbent in the present invention shall preferably be raised compared to today's practice.

The present invention will be described in further detail with reference to the enclosed figures where:

FIG. 1: Illustrates a desorption process according to the present invention.

FIG. 2: Illustrates another embodiment of the process illustrated in FIG. 1.

FIG. 3: Illustrates a second embodiment of the present invention where the flash unit is a heated, stratified flow pipe.

FIG. 4: Illustrates a third embodiment of the present invention where the flash unit is a fired heater and a vessel.

However it should be understood that the figures are enclosed for illustration purposes and that the scope of the present invention is not limited to the illustrated embodiments.

The present invention is in the present description illustrated by referring to MEA (MonoEtanholAmine) as absorbent, however it should be understood that the present invention is equally applicable for use with other amines and especially for absorbents where the binding energy of $CO_2$ in the absorbent is less than for MEA.

The temperature and pressure for the flash must in each case be selected according to the chosen absorbent.

In the prior art solution the purpose of the stripper and the reboiler is to release $CO_2$ from a rich amine liquid into a vapour phase in direct contact with the liquid. The stripper column in existing technology operates with a lower temperature of the rich amine entering at the top of the column compared to the temperature of the lean amine outlet at the bottom of the stripper. However, if the temperature of the rich amine is increased from typically 110° C. to about 120° C. at about 2 bar absolute more $CO_2$ will immediately be released at the stripper inlet making the loading at the top of the column approximately equal to the lean amine loading at the bottom. Hence, the stripper column may be superfluous, or at least, the packed column height can be considerably reduced, since much $CO_2$ is flashed off before the liquid starts flowing down the column.

The main idea of the invention is to keep the inlet temperature and pressure of the rich amine at such values that the result after the flash is a moderate vapour fraction and a liquid with a specified lean amine loading. This is done by tuning the process with respect to liquid temperature and specified lean amine loading. The flash requires a "flash-tank", which can be any appropriate heat exchanger.

The lean MEA loading after flash is shown in Table 1 for various liquid temperatures and a typical pressure of 1.8 bara absolute. The weight percent MEA is 30% in this example, which is common for traditional column strippers.

Table 1 illustrates how a higher temperature results in desorption of more $CO_2$ from MEA during a flash process.

TABLE 1

Lean amine loading as function of inlet liquid temperature and pressure for 30 w % MEA, using Kent-Eisenberg equilibrium method

| Flash calc. no. | Fluid temp. ° C. | Pressure (bara) | Rich amine loading (mol $CO_2$/mol MEA) | Lean amine loading (mol $CO_2$/mol MEA) |
|---|---|---|---|---|
| 1 | 109.0 | 1.8 | 0.42 | 0.38 |
| 2 | 115.0 | 1.8 | 0.42 | 0.31 |
| 3 | 120.0 | 1.8 | 0.42 | 0.17 |

There are several candidates for the "flash-tank" as described later on. The $CO_2$, vapour and amine released in the flash immediately leaves the "flash tank" at the top. The gas mixture is then cooled and separated in a condenser as in existing technology. The separated colder water and amine mixture may then be mixed with the lean amine from the "flash tank" to maintain the liquid circulation rate and w % of amine.

When flashing the specified rich amine in a "flash tank", at a higher temperature T and at an appropriate pressure P, the result after the flash is a moderate vapour fraction and a predefined lean amine loading.

The present method is flexible with respect to getting specified value of lean and rich amine loading. This is controlled by using correct temperature and pressure.

The "flash tank" in this context is any heat exchanger that makes the stripper column superfluous or at least reduced in size. Below some examples of heat exchangers are given. The first idea is to let the "flash tank" be an existing or a modified kettle reboiler. This embodiment is illustrated in FIG. 1. Here rich amine 10 passes through a pump 12 and valve 14 and enters the reboiler 18 via stream 16. Flashing of the rich amine results in a vapour phase comprising $CO_2$ and solvent but which may also comprise a part of the absorbent. The vapour phase is passed through stream 24 to a condenser 26, where the solvent and the absorbent are condensed whereas the $CO_2$ stays in the gas phase and is withdrawn through stream 28. The condensate is passed through stream 30 and combined with the stream of lean absorbent 36 from the reboiler 18. The stream 30 having been cooled in the condenser 26 will hold a lower temperature and the combination of the two streams result in a lean absorbent stream 34 which has a lower temperature than would have been the case if the condensate had been returned to the reboiler/flash-tank. A pump 38 pumps the lean absorbent into stream 40 which is connected to the absorber (not shown). Heat is supplied to the reboiler 18 by entering steam trough stream 20 and removing steam with a reduced temperature through stream 22. In this embodiment the traditional stripper column has been fully eliminated which makes the system more simple. Further the lean absorbent stream 40 may have a lower temperature and therefore requires less cooling before it can enter the absorber, dependent on the temperature within the reboiler.

In this example the rich amine from the absorber enters the reboiler directly without first passing through a countercurrent packed column stripper. The temperature T and pressure P in the reboiler is tuned to give correct lean amine out of the reboiler. The vapour leaving the reboiler is condensed in the condenser, and the cold liquid from the condenser is mixed with the warm lean amine from the reboiler. This ensures that the liquid circulation rate and w % amine in the system is fairly constant. The loading of the lean amine returning to the absorber may be slightly changed after the mix of the two liquid streams. The correct temperature of the liquid in the reboiler is in this example controlled by the steam consumption and steam temperature.

The condensed water with amine is, in the present invention, used to cool the lean amine which is produced in the reboiler. This is an advantage compared to existing technology since the lean amine must anyway be cooled before it re-enters the absorber. The lean loading is normally not altered much after mixing of these two liquid streams. Which vapour fraction is best depends on the chosen level of the lean and rich amine and the capacity of the condenser. The complete desorption process can be optimized accordingly.

FIG. 2 illustrates a further possible aspect of the embodiment of the present invention illustrated in FIG. 1, but with two optional refluxes in the reboiler. Here the lean absorbent stream from the reboiler may be partly returned either as stream 46 to the rich absorbent stream or partly as stream 44 heated in heat exchanger 42 and returned to the reboiler as stream 48. This solution with streams 44 and 46 can be used for additional lean amine loading control if necessary.

In one aspect of the present invention it is possible to connect more reboilers in series, however to lower the complexity and the number of units it is considered advantages to use only one reboiler.

In FIG. 3 a second embodiment of the present invention is shown. Here the reboiler utilized in the embodiments illustrated in FIG. 1 and has been replaced by a heated, stratified flow pipe 17. The rich absorbent stream 16 enters the pipe 17 at one end. Within the pipe the flashing occurs, and the stream is split into a liquid phase 25 and a vapour phase 23. Heat 21 is supplied to the pipe from the outside. At the end of pipe 17 vapour phase is directed into line 24 and into a condenser 26 similar to the embodiments illustrated on FIGS. 1 and 2. The lean absorbent is directed as stream 36, mixed with the condensate in stream 30 and returned to the absorber (not shown) via stream 40. Some lean amine may optionally be recycled through stream 46 to the pipe inlet, possibly with heating of the recycled stream (not shown). The conditions for obtaining stratified flow in pipes are well known in the art and can be found in flow regime charts in handbooks or text books. The pipe can be coiled if that is practical for space reasons or other reasons. Optionally the cross-sectional area of the pipe can vary with axial position to obtain best performance. The cross-sectional area can be elliptic, circular or any other suitable shape.

The embodiment illustrated in FIG. 4 is similar to the embodiment shown in FIG. 1 except that the reboiler has been replaced by a fired heater 19 and a vessel 33. The rich absorbent in stream 16 enters the fired heater where external heat is added. The heating and flashing within the fired heater 19 transports the fluid into the vessel 33. Here the fluid is separated into a vapour phase which is transferred over stream 24 to the condenser 26. The liquid lean absorbent phase in vessel 33 is removed through stream 36 at the bottom. It can be mixed with the condensate in stream 30 and returned to the absorber (not shown) via stream 40. The vessel 33 may be equipped with a liquid control unit 32. The $CO_2$ gas is removed through stream 28. If the lean amine loading from the first flash tank is higher than specified, two or more fired heaters with flash tanks can be connected in series. Some lean absorbent may optionally be recycled through line 46 to the fired heater 19 with or without heating of the recycled stream.

The figures illustrate some embodiments of the "flash tank" according to the present invention but also other units can be applied. The "flash tank" in this context can be any appropriate heat exchanger with rich absorbent kept at appropriate T and P. For example the flash tank can be a fired heat exchanger (fired reboiler), a tank with heating coils (with steam or another heat source), a thermosyphon reboiler (circulation driven by differences in density), a pipe transporting rich amine and heated to correct temperature and pressure, where gas and lean amine is separated by flashing the rich amine liquid along the pipe or any other appropriate heat exchanger. An example of the latter is where the flash appears in a spiral coil tube or in parallel spiral coil tubes rather than in a straight pipe. In that case the spiral coil or coils can for example be wound on a solid cylinder. A spiral coil has the advantage of obtaining a long flash pipe with reduced height or length compared to a straight pipe.

EXAMPLE

As an example of the idea, a flash calculation using HYSYS process simulator, indicates that a temperature of about 120° C. and a pressure of about 1.8-2 bars absolute are appropriate in order to get a typical value of the lean amine loading. Other (T,P) combinations are possible depending on the wanted lean and rich amine loading and the maximum vapour fraction one allows after the flash. Some processes are based on a low value for lean amine loading (typically 0.16) and a moderate value for rich amine loading (0.36). Other processes are based on a high value for lean amine loading (typically 0.23) and a rich amine loading (typically 0.45).

What is claimed is:

1. A method for desorbing carbon dioxide from a $CO_2$ rich absorption fluid comprising a $CO_2$ absorbent, a solvent and absorbed $CO_2$, the method comprising:
heating the $CO_2$ rich absorption fluid,
expanding the heated $CO_2$ rich absorption fluid in a flash tank,
separating the expanded absorption fluid in a vapour phase comprising desorbed $CO_2$ and vaporised solvent and a main liquid phase comprising $CO_2$ lean absorption fluid,
condensing at least part of the solvent within the vapour phase,
recycling a part of the main liquid phase which has left the flash tank into the $CO_2$ rich absorption fluid which is about to enter the flash tank, and then
mixing the condensed solvent with the rest of the main liquid phase comprising $CO_2$ lean absorption fluid from the flash tank to obtain a cooled $CO_2$ lean absorption fluid which is all recirculated back to a $CO_2$ absorption unit for use as a $CO_2$ absorbent in said absorption unit.

2. A method according to claim 1, wherein the absorption fluid comprises amine and the difference in $CO_2$ loading between the rich and lean amine stream is within the range 0.20-0.30 mol $CO_2$/mol absorbent.

3. A method according to claim 1 further comprising heating a part of the main liquid phase and returning it to the flash tank.

4. A method according to claim 1, wherein the absorption fluid comprises amine and the difference in $CO_2$ loading between the rich and lean amine stream is within the range 0.23-0.27 mol $CO_2$/mol absorbent.

* * * * *